United States Patent [19]

Kondo et al.

[11] Patent Number: 4,736,701
[45] Date of Patent: Apr. 12, 1988

[54] DYNAMIC VIBRATION ABSORBER

[75] Inventors: Kiyoshi Kondo, Tsu; Kiyotaka Uno, Hisai; Fukuhiko Kataoka; Kozo Asano, both of Tsu, all of Japan

[73] Assignee: Nippon Kokan Kabushiki Kaisha, Tokyo, Japan

[21] Appl. No.: 867,243

[22] Filed: May 23, 1986

[30] Foreign Application Priority Data

Jun. 4, 1985 [JP] Japan .................................. 60-120820
Jun. 27, 1985 [JP] Japan .................................. 60-141192
Feb. 18, 1986 [JP] Japan .................................. 61-33363

[51] Int. Cl.$^4$ ............................................. B63B 15/00
[52] U.S. Cl. ........................................ 114/340; 52/1;
  114/90; 114/270; 188/379; 188/380
[58] Field of Search ................ 114/90, 339, 340, 270;
  188/378-380; 267/136, 140.1; 52/1; 248/562,
  638; 174/42

[56] References Cited

U.S. PATENT DOCUMENTS

| 2,736,393 | 2/1956 | O'Connor | 188/380 |
| 3,174,589 | 3/1965 | Chen | 52/1 X |
| 3,259,212 | 7/1966 | Nishioba et al. | 188/378 |
| 3,314,503 | 4/1967 | Neubert | 188/379 |
| 4,325,133 | 4/1982 | Reitmayer | 248/638 X |

Primary Examiner—Sherman D. Basinger
Attorney, Agent, or Firm—Frishauf, Holtz, Goodman & Woodward

[57] ABSTRACT

A vibration damping arrangement for a structural member including leaf springs extending horizontally from a vibration absorber body adapted to be attached to the structural member. A set of horizontal-vibration-absorbing leaf springs extends in one horizontal plane while a set of vertical-vibration-absorbing leaf springs extends in another horizontal plane. A weight is mounted on the distal end of each leaf spring. The relative positions of the leaf springs in their respective planes are staggered around a vertical axis.

13 Claims, 3 Drawing Sheets

DYNAMIC VIBRATION ABSORBER

BACKGROUND OF THE INVENTION

The present invention relates to a dynamic vibration absorber for absorbing vibration of a structure, and more specifically to a dynamic vibration absorber for absorbing multidirectional vibration.

In general, radar masts or crane posts of vessels, sail posts of sailboats, etc., are low in vibration damping capability. They sometimes whirl violently when they resonate with the exciting force of main engines or propellers, or when they are exposed to the wind. Projecting long from the hull, these structures are so unstable that they cannot easily be damped, especially if they are large-sized.

Dynamic vibration absorbers of a pendulum type are conventionally known as a means of vibration prevention. In these absorbers, a ring-shaped weight is suspended from the top of a tower by means of a plurality of wires. However, the absorbers of this type cannot practically be applied to low-frequency vibrations with a frequency of one hertz or more.

Also generally known are dynamic vibration absorbers of a spring-supported pendulum type, in which vibration of an oscillating structure is absorbed by a spring-mass system having a natural frequency equivalent to the oscillation frequency of the structure.

However, one such prior art dynamic vibration absorber can absorb only vibration in one direction. Therefore, absorption of, for example, whirling vibration additionally requires the use of another dynamic vibration absorber which absorbs vibration in a direction perpendicular to the first direction, thus necessitating a wide installation space. In order to absorb vertical vibration besides the whirling vibration, still another absorber must be used exclusively for the vertical vibration, requiring a further increased setting space.

SUMMARY OF THE INVENTION

The object of the present invention is to provide a dynamic vibration absorber of a compact design capable of absorbing multidirectional vibration of a structure.

According to the present invention, there is provided a dynamic vibration absorber which comprises dynamic vibration absorber units of a spring-supported pendulum type arranged in different directions on or in a dynamic vibration absorber body.

The dynamic vibration absorber units are arranged at right angles to one another within a horizontal plane so as to absorb whirling vibration of the structure.

The dynamic vibration absorber body is provided with horizontal vibration absorber units for absorbing horizontal vibration and vertical vibration absorber units for absorbing vertical vibration, whereby three-dimensional vibration of the structure is absorbed.

DETAILED DESCRIPTION OF THE PREFERRED EMBODIMENTS

Figure 1:
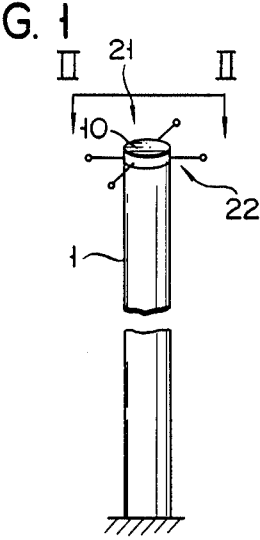
FIG. 1 is a perspective view showing a first embodiment of the present invention.
Figure 2:
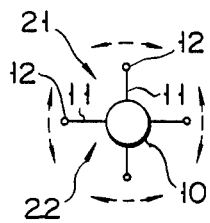
FIG. 2 is a plan view as taken from line II—II of FIG. 1.

Referring now to FIGS. 1 and 2, a first embodiment of the present invention will be described. In these drawings, a dynamic vibration absorber is mounted atop mast 1. It comprises circular dynamic vibration absorber body 10 and dynamic vibration absorber units 21 and 22 for absorbing vibrations in X- and Y-directions, respectively. Units 21 and 22 are attached to body 10 in symmetrical relation. Each of them is formed of leaf spring 11 with spring constant k and weight 12 with mass m attached thereto.

Whirling vibration of mast 1 can be damped by setting mass m of weight 12 and the effective spring constant of leaf spring 11 so that the natural frequency of units 21 and 22, arranged in the two different directions, is equal to that of the mast.

Figure 3A:
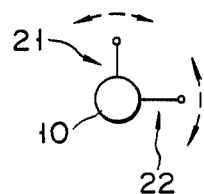
FIGS. 3(a) and 3(b) are plan views individually showing alternative arrangements of dynamic vibration absorber units.
Figure 3B:
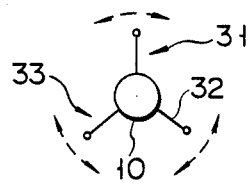

Alternatively, absorber units 21 and 22 for the X-and Y-directions may be mounted only on one side of absorber body 10, as shown in FIG. 3(a). As shown in FIG. 3(b), moreover, three dynamic vibration absorber units 31, 32 and 33 may be arranged at regular intervals around body 10.

Figure 4:
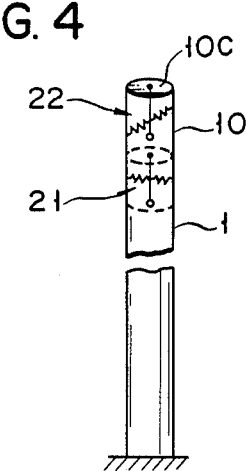
FIG. 4 is a perspective view for illustrating a second embodiment of the invention.
Figure 5:
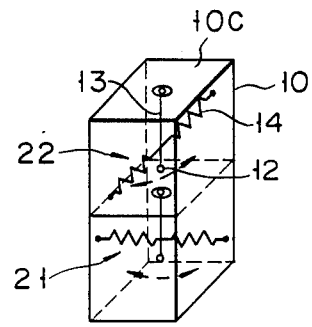
FIG. 5 is a diagram for illustrating the arrangement of dynamic vibration absorber units shown in FIG. 4.

Referring now to FIGS. 4 and 5, a second embodiment of the invention will be described. In this embodiment, the top portion of mast 1 constitutes dynamic vibration absorber body 10 by itself. Dynamic vibration absorber units 21 and 22 for absorbing vibrations in the X- and Y-directions, respectively, are arranged in layers in body 10. In each of units 21 and 22, weight 12 is rockably attached to mounting plate 10c by means of arm 13, and a pair of coil springs 14 are stretched individually between arm 13 and the inside wall of the mast. In this case, whirling vibration of mast 1 can be damped in the same manner as in the first embodiment.

Figure 6:
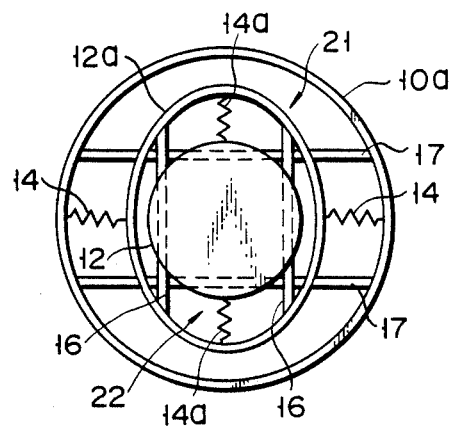
FIG. 6 is a plan view showing a third embodiment of the invention.

Referring now to FIG. 6, a third embodiment of the invention will be described. Elliptical inner frame 12a is supported within ring-shaped outer frame 10a, as an absorber body, a pair of coil springs 14 stretched in the X-direction. Frame 12a can move in the X-direction, guided by a pair of guide members 17 inside frame 10a. Inside inner frame 12a, weight 12 is supported by means of a pair of coil springs 14a stretched in the Y-direction. It can move in the Y-direction, guided by a pair of guide members 16 inside inner frame 12a. Thus, springs 14a and the mass of weight 12 form Y-direction dynamic vibration absorber unit 22, while springs 14 and the respective masses of weight 12 and inner frame 12a constitute X-direction dynamic vibration absorber unit 21.

Whirling vibration of a post or the like can be damped by mounting the dynamic vibration absorber of the above described construction on the top portion of the post, or by setting the absorber in the post so that the wall of the post serves as an outer frame.

Figure 7:
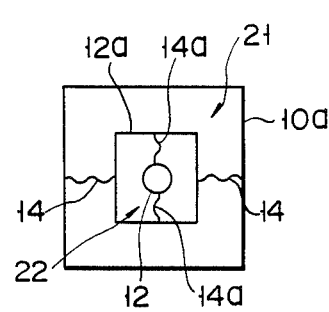
FIG. 7 is a plan view showing a modification of the third embodiment.

As shown in FIG. 7, outer and inner frames 10a and 12a may alternatively be square-shaped.

Figure 8A:
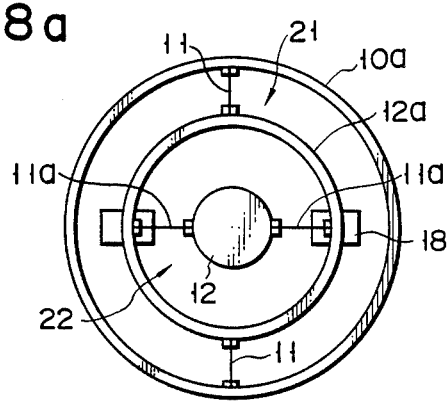
FIG. 8(a) is a plan view showing a fourth embodiment of the invention with a top plate removed.
Figure 8B:
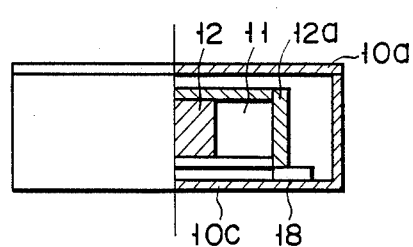
FIG. 8(b) is a side view, half in vertical section, showing the fourth embodiment.

Referring now to FIGS. 8(a) and 8(b), a fourth embodiment of the invention will be described. In this embodiment, outer frame 10a is formed of a ring-shaped closed container in which oil is sealed. Ring-shaped inner frame 12a is supported by a pair of leaf springs 11 extending in the Y-direction. It can move in the X-direction on guide member 18 which is mounted on bottom plate 10c of the outer frame. Inside inner frame 12a, weight 12 is supported by a pair of leaf springs 11a extending in the X-direction, and can move in the Y-direction. The whirling vibration of a post or the like can be damped in the same manner as in the third embodiment. The dynamic vibration absorber can effect optimum damping if oil with a suitable viscosity is sealed therein.

Figure 9A:
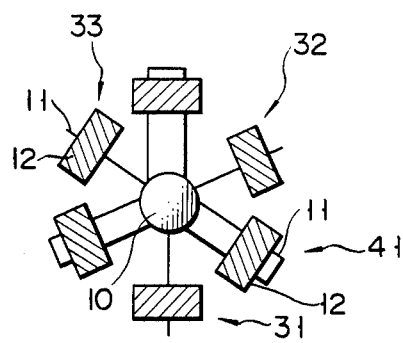
FIGS. 9(a), 9(b) and 9(c) are a plan view, side view, and perspective view, respectively, showing a fifth embodiment of the invention.
Figure 9B:
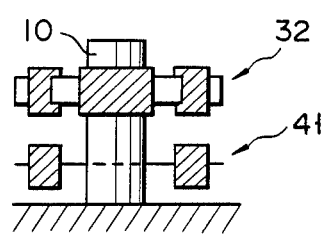
Figure 9C:
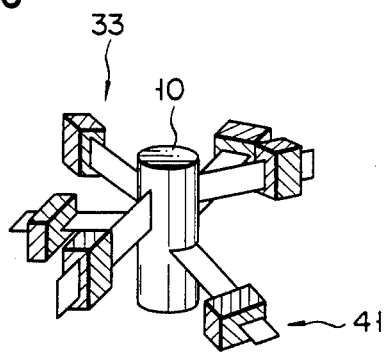

Referring now to FIGS. 9(a), 9(b) and 9(c), a fifth embodiment of the invention will be described. A plurality of vertical vibration absorber units 41 for absorbing vertical vibration and horizontal vibration absorber units 31, 32 and 33 for absorbing horizontal vibration are attached to cylindrical dynamic vibration absorber body 10, spaced vertically. Vertical units 41 each include horizontal leaf spring 11 attached to body 10 and weight 12 movably mounted on the spring. Horizontal units 31 to 33 each include vertical leaf spring 11 attached to body 10 and movable weight 12 on the spring. In this embodiment, three vibration absorber units 41 are arranged circumferentially at regular intervals at the lower side of body 10, and the other three units 31, 32 and 33 are arranged at the upper side of body 10 with a phase difference of 60 degrees from units 41.

Constructed in this manner, the dynamic vibration absorber of this embodiment can absorb vibration in all directions (number of degrees of freedom is 6), including torsional vibration. Since upper units 31 to 33 and lower units 41 are arranged with the phase difference of 60 degrees, the absorber can enjoy a compact design without the possibility of upper and lower weights 12 running against one another.

Leaf springs 11 may be formed of a so-called vibration-damping steel plate which formed of two steel sheets and a visco-elastic material sandwiched between them for higher damping capability.

What is claimed is:

1. A dynamic vibration absorber adapted to absorb vibration of a structural member, comprising:
   a vertically extending vibration absorber body having a vertical axis and adapted to be mounted to said structural member;
   a plurality of horizontal-vibration absorber units coupled respectively to said vibration absorber body at equal intervals around the vertical axis and extending substantially horizontally therefrom at substantially the same first vertical height, wherein each of the horizontal-vibration-absorber units is elongated with one end being connected to the vibration absorber body and the other end being free;
   a plurality of vertical-vibration-absorber units of the same number as said plurality of horizontal-vibration-absorber units coupled respectively to said vibration absorber body at equal intervals around the vertical axis and extending substantially horizontally therefrom at substantially the same second vertical height different from the first vertical height; and
   said horizontal-vibration-absorber units being respectively arranged around the vertical axis to extend therefrom so as to be staggered with respect to the vertical-vibration-absorber units.

2. The dynamic vibration absorber according to claim 1 wherein each of the vertical-vibration-absorber units is elongated with one end being connected to the vibration absorber body and the other end being free.

3. The dynamic vibration absorber according to claim 2, wherein a weight is mounted on the free end of the respective horizontal and vertical vibration absorber units.

4. The dynamic vibration absorber according to claim 3, wherein said weight is adjustable in position along said respective horizontal and vertical absorber units.

5. The dynamic vibration absorber according to claim 4, wherein said horizontal-vibration-absorber unit comprises a leaf spring.

6. The dynamic vibration absorber according to claim 5, wherein the vertical-vibration-absorber unit comprises a leaf spring.

7. The dynamic vibration absorber according to claim 6, wherein the horizontal and vertical vibration absorber units, respectively, extend horizontally from said vibration absorber body in different horizontal planes.

8. The dynamic vibration absorber according to claim 7, wherein the leaf spring of each horizontal-vibration-absorber unit has flattened, opposed surfaces facing in a horizontal direction.

9. The dynamic vibration absorber according to claim 8, wherein the leaf spring of each vertical-vibration-absorber unit has flattened, opposed surfaces facing in a vertical direction.

10. The dynamic vibration absorber according to claim 9, wherein the leaf spring is comprised of a vibration-damping steel plate.

11. The dynamic vibration absorber of claim 4, wherein the number of horizontal and vertical vibration absorber units is the same.

12. The dynamic vibration absorber according to claim 6, wherein the leaf spring is comprised of a vibration-damping steel plate.

13. The dynamic vibration absorber according to claim 1, wherein the horizontal and vertical-vibration-absorber units, respectively, extend horizontally from said vibration absorber body in different horizontal planes.

* * * * *